(12) United States Patent
Buttress

(10) Patent No.: US 10,668,579 B2
(45) Date of Patent: Jun. 2, 2020

(54) APPARATUS FOR JOINING SOLAR RECEIVER TUBES

(71) Applicant: David Buttress, San Jose, CA (US)

(72) Inventor: David Buttress, San Jose, CA (US)

( * ) Notice: Subject to any disclaimer, the term of this patent is extended or adjusted under 35 U.S.C. 154(b) by 648 days.

(21) Appl. No.: 14/728,979

(22) Filed: Jun. 2, 2015

(65) Prior Publication Data
US 2015/0336196 A1    Nov. 26, 2015

Related U.S. Application Data

(62) Division of application No. 12/822,051, filed on Jun. 23, 2010, now Pat. No. 9,126,290.

(60) Provisional application No. 61/220,120, filed on Jun. 24, 2009, provisional application No. 61/238,195, filed on Aug. 30, 2009.

(51) Int. Cl.
| | |
|---|---|
| *B23K 9/028* | (2006.01) |
| *B23K 9/16* | (2006.01) |
| *B23K 37/053* | (2006.01) |
| *F24S 10/40* | (2018.01) |
| *F24S 80/30* | (2018.01) |
| *F24S 25/60* | (2018.01) |

(52) U.S. Cl.
CPC .......... *B23K 37/053* (2013.01); *B23K 9/0286* (2013.01); *B23K 9/16* (2013.01); *B23K 37/0533* (2013.01); *F24S 10/45* (2018.05); *F24S 80/30* (2018.05); *F24S 2025/6011* (2018.05); *Y02E 10/44* (2013.01); *Y10T 29/49355* (2015.01); *Y10T 29/49357* (2015.01); *Y10T 29/49393* (2015.01)

(58) Field of Classification Search
None
See application file for complete search history.

(56) References Cited

U.S. PATENT DOCUMENTS

| | | | | |
|---|---|---|---|---|
| 3,925,854 A | * | 12/1975 | McFadden | B23K 37/0533 219/161 |
| 4,027,653 A | * | 6/1977 | Meckler | F24J 2/055 126/605 |
| 4,092,979 A | * | 6/1978 | Kotlarz | F24J 2/06 126/628 |
| 4,100,915 A | * | 7/1978 | Carlson | F24J 2/14 126/605 |
| 4,143,801 A | * | 3/1979 | Sargent | B21C 37/08 219/60 R |
| 4,176,269 A | * | 11/1979 | Merrick | B23K 9/0286 219/161 |
| 4,186,724 A | * | 2/1980 | Nelson | F24S 10/45 126/657 |
| 4,186,725 A | * | 2/1980 | Schwartz | F24J 2/055 126/634 |
| 4,291,683 A | * | 9/1981 | Bayles | F24S 20/67 126/623 |

(Continued)

*Primary Examiner* — Ibrahime A Abraham
*Assistant Examiner* — Gyounghyun Bae
(74) *Attorney, Agent, or Firm* — Steven R. Vosen

(57) ABSTRACT

A system for rapidly assembling solar receiving tubes and solar energy systems comprises a welding station is described. The welding station provides for rapidly assembling solar receiver tubes by welding together two or more solar receiving tubes and comprises means for receiving and restraining solar receiver tubes and a welding station comprising an orbital or a rotational weld head.

13 Claims, 17 Drawing Sheets

(56) References Cited

U.S. PATENT DOCUMENTS

| | | | | |
|---|---|---|---|---|
| 4,296,738 A * | 10/1981 | Kelton | ............... | F24S 10/45 |
| | | | | 126/656 |
| 4,326,503 A * | 4/1982 | Geier | ............... | F24J 2/055 |
| | | | | 126/569 |
| 4,328,792 A * | 5/1982 | Shores | ............... | F24J 2/10 |
| | | | | 126/605 |
| 4,545,569 A * | 10/1985 | Schroder | ............... | B29C 65/7802 |
| | | | | 269/43 |
| 4,674,477 A * | 6/1987 | Tabor | ............... | F24S 10/40 |
| | | | | 126/652 |
| 4,821,408 A * | 4/1989 | Speller, Sr. | ............... | B23P 21/004 |
| | | | | 29/281.5 |
| 5,167,218 A * | 12/1992 | Deakin | ............... | C23C 4/123 |
| | | | | 126/569 |
| 5,975,405 A * | 11/1999 | Tsuchiya | ............... | B23K 20/00 |
| | | | | 228/44.5 |
| 6,196,216 B1 * | 3/2001 | Kooij | ............... | B29C 65/02 |
| | | | | 126/651 |
| 6,526,965 B1 * | 3/2003 | Devore | ............... | E04H 4/129 |
| | | | | 126/563 |
| 6,705,311 B1 * | 3/2004 | Schwartzman | ............... | F24J 2/055 |
| | | | | 126/652 |
| 7,013,887 B2 * | 3/2006 | Kuckelkorn | ............... | F24J 2/055 |
| | | | | 126/652 |
| 8,162,201 B2 * | 4/2012 | Gomes Fernandes | .. | F16L 1/038 |
| | | | | 219/59.1 |
| 8,683,994 B2 * | 4/2014 | Bellman | ............... | F24S 70/10 |
| | | | | 126/653 |
| 10,088,200 B2 * | 10/2018 | Russell | ............... | B23P 15/26 |
| 2004/0217096 A1 * | 11/2004 | Lipnevicius | ............... | B23K 9/0216 |
| | | | | 219/125.11 |
| 2007/0119829 A1 * | 5/2007 | Vietz | ............... | B23K 26/04 |
| | | | | 219/121.63 |

* cited by examiner

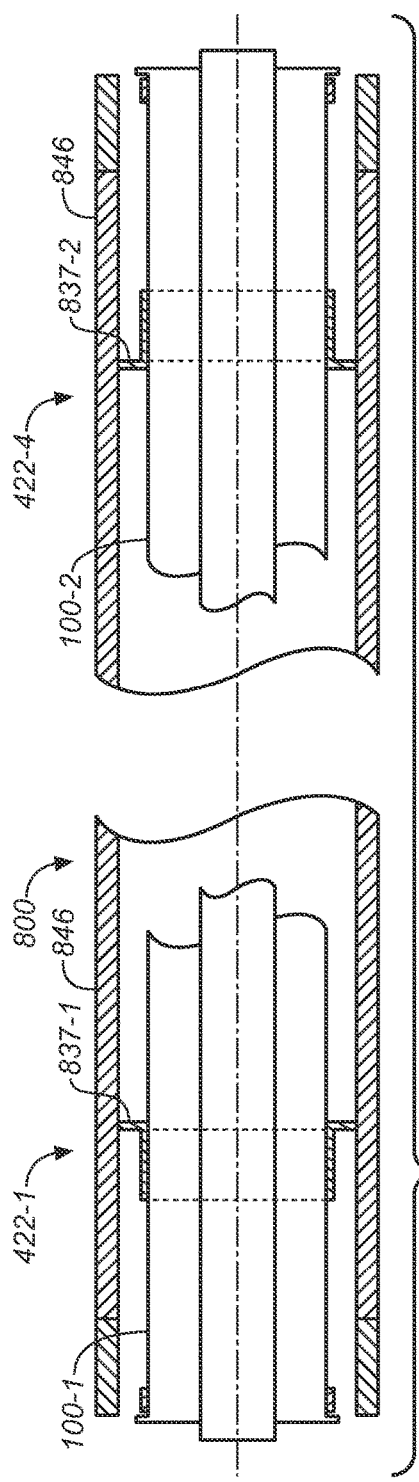
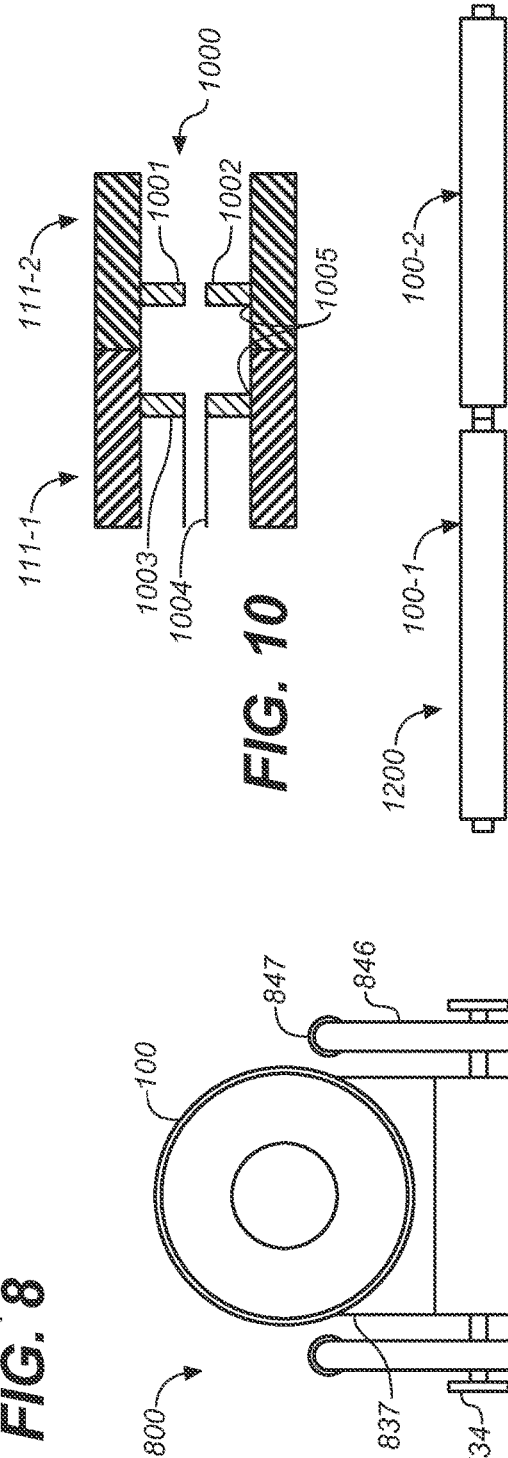
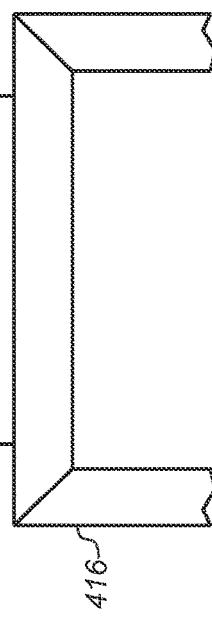

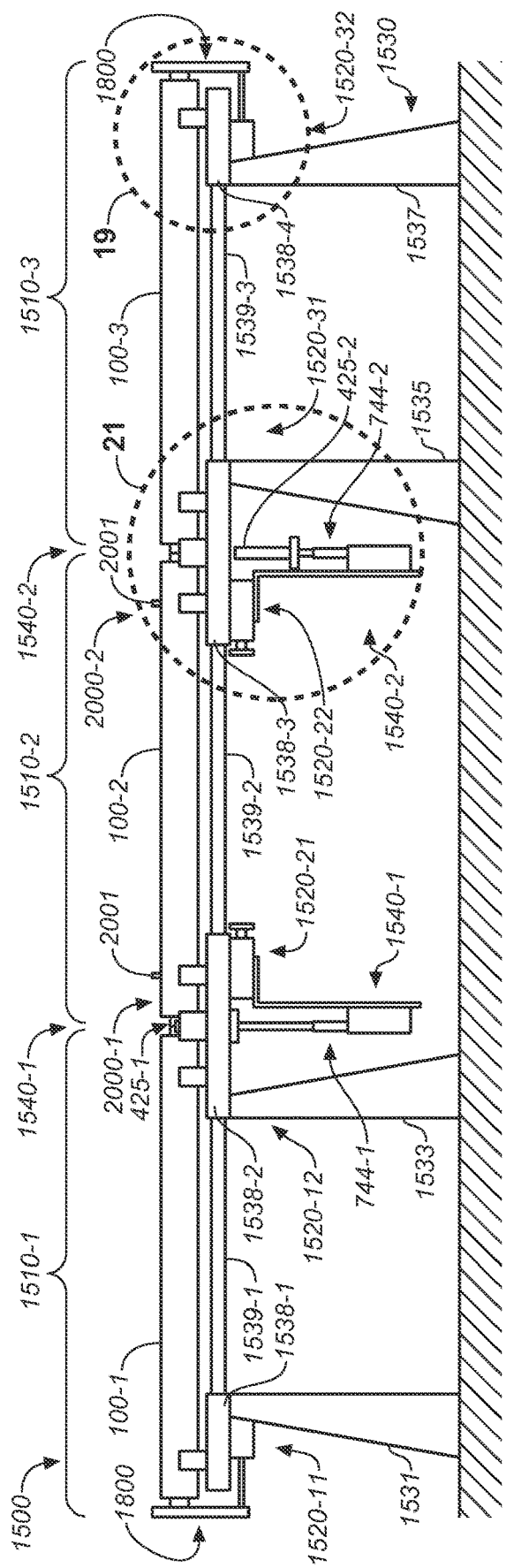
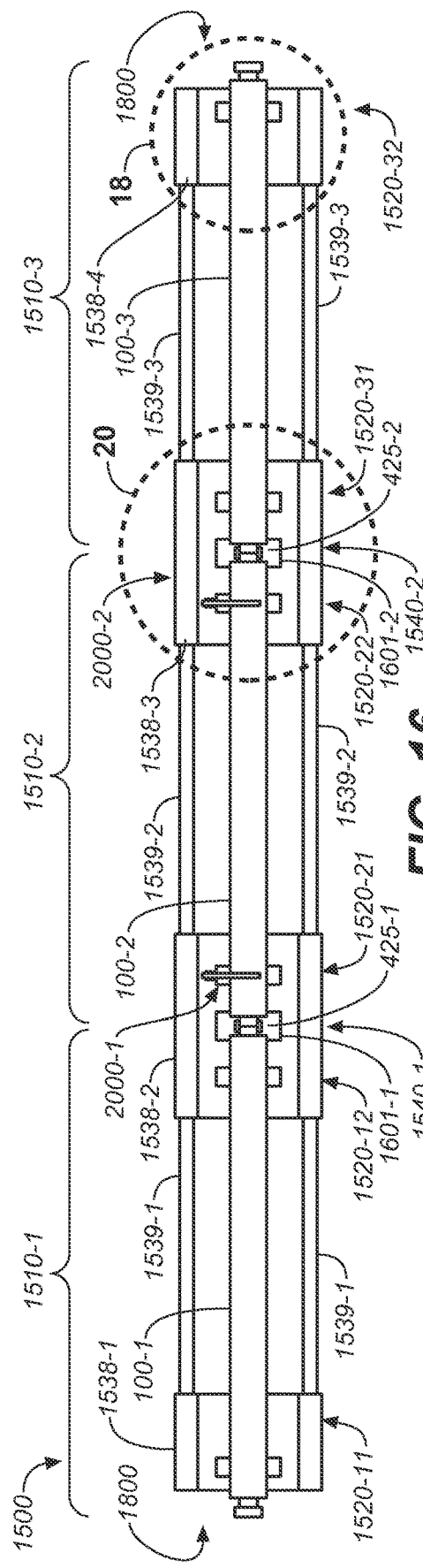
FIG. 15
FIG. 16

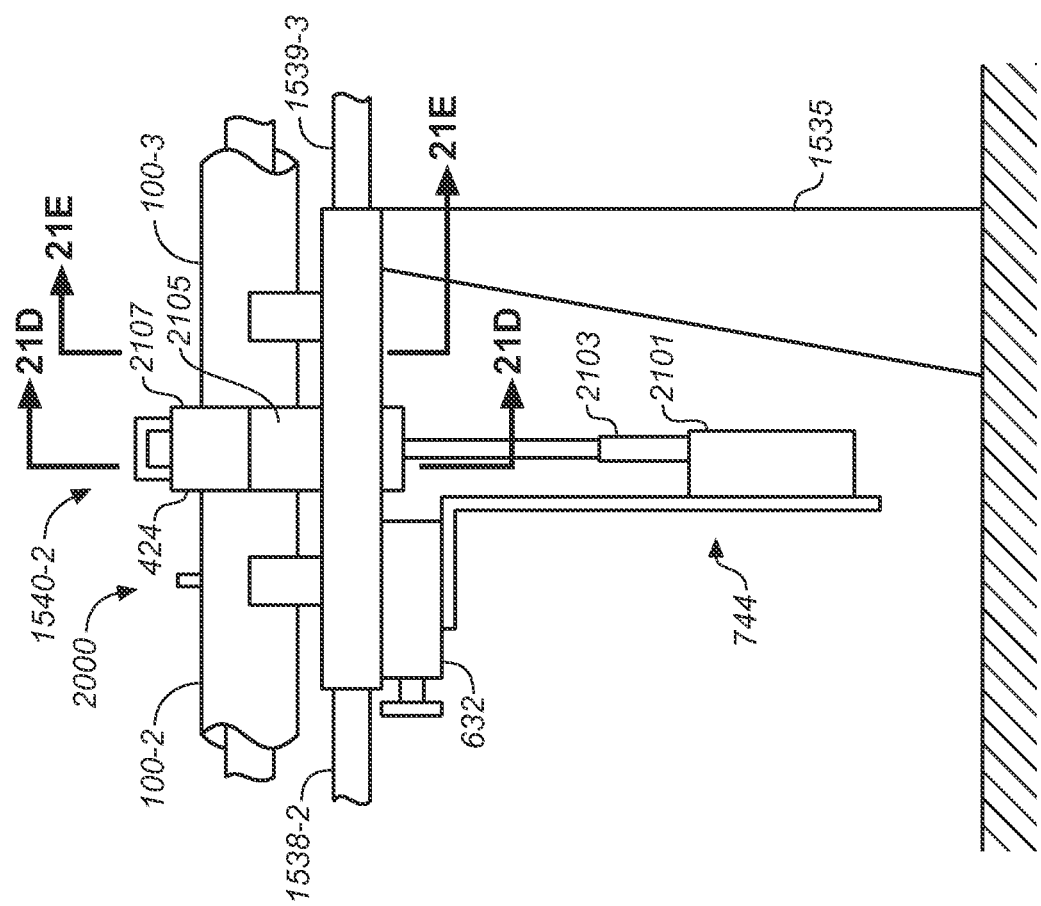

APPARATUS FOR JOINING SOLAR RECEIVER TUBES

CROSS-REFERENCE TO RELATED APPLICATIONS

This Application claims the benefit of priority under 35 U.S.C. 119(e) to U.S. Provisional Application No. 61/220,120, filed Jun. 24, 2009, of U.S. Provisional Application No. 61/238,195, filed Aug. 30, 2009, both of which are incorporated by reference in their entirety.

BACKGROUND OF THE INVENTION

Field of the Invention

The present invention generally relates to apparatus and methods for assembling pipes, and more particularly to methods and systems for joining tubes for solar receivers.

Description of Related Art

Solar thermal power plants may be used to obtain electric power from the sun. In such plants, the solar flux impinges on tubes through which a heat exchange medium flows. In some solar thermal power plants, tubes are situated in a solar collector, such as along the axis of a parabolic trough. The heated heat exchange medium from the tubes may be used in a thermodynamic cycle to generate electric power.

FIGS. 1-3 show a typical prior art tube 100 for use in solar thermal plants. Tubes 100 are sometimes referred to as "solar receiver tubes" or "heat collection elements (HCE)." Tube 100 may be, for example and without limitation, a SCHOTT solar receiver tube model PTR 70 (SCHOTT Solar, Inc., Albuquerque N. Mex.). Tube 100 having a length L includes an outer tube 110 having a diameter D capped at each end by a flange 115, an inner tube 111 coaxial with outer tube 110 and having a diameter d, and a bellows 113 that connects the flange and inner tube. Tubes 110 and 111, bellows 113 and flange 115 are sealed to form a volume 112, which is evacuated to provide a high thermal insulation between tubes 110 and 111.

In general, the length L is from 5 feet (1.5 m) to 20 feet (6 m), the diameter D is from 2 inches (50 mm) to 7 inches (0.18 m), and the diameter d is from 1 inch (25 mm) to 4 inches (0.1 m).

Typically, tube 110 is a glass tube, and tube 111, flange 115, and bellows 113 are metal. Tube 110 is generally transparent to sunlight to facilitate the solar heating of a heat exchange medium that may flow through tube 111, as indicated by arrows in FIG. 1.

In certain embodiments, tube 111 protrudes longitudinally beyond the end of each flange 115 by a distance S, which it typically from 0.375 inches (10 mm) to 4 inches (0.1 m). The portion of tube 111 that so protrudes is referred to as a collar 114. In certain other embodiments, solar energy systems are formed from multiple solar receiver tubes 100 by joining collars 114 of adjacent tubes. Collar 114 may includes an index, which may be the center line of the tube weld joint, which may be used to rotationally align adjacent tubes for welding.

Due their length, L, and glass components, solar receiver tubes tend to be fragile, and difficult to join, typically by welding, since the collars 114 protrude beyond the ends of the glass outer tube 110 by a relatively small distance from each end. Further, collars 114 are adjacent to bellows 113, on whose integrity the vacuum of volume 112 depends. Solar receiver tube are thus difficult to join without damaging the more fragile glass outer tube 110 or the bellows 113 joining tubes 110 and 111. There is a need in the art for methods and apparatus that permit the easy and rapid joining of such tubes to facilitate more efficient assembly of solar energy systems.

BRIEF SUMMARY OF THE INVENTION

The present invention overcomes the limitations and problems of the prior art by providing an apparatus and method for rapidly tubes, which maybe used for solar energy systems. A welding station provides for rapidly assembling tubes by welding together two or more such tubes.

In one embodiment, an apparatus for joining two or more tubes is provided. Although not part of the invention, the solar receiver tubes have a longitudinal axis extending from a first end and a second end, and include an outer tube and a coaxial inner tube. The apparatus includes a weld head, a first means for receiving a first solar receiver tube, and a second means for receiving a second solar receiver tube. The first means allows the first end of the inner tube of the first solar receiver tube to be positioned near the weld head. The second means for receiving the second solar receiver tube, where the second means allows the first end of the outer tube of the second solar receiver tube to be positioned with the first end of inner tube of the second solar receiver tube near the weld head. The apparatus further includes translations stages to position the first ends of the received inner tubes in the weld head.

In another embodiment, the apparatus accepts a third solar receiver tube and joins three tubes. In yet another embodiment, the weld head is an orbital weld head.

In one embodiment, a method for joining tubes in a welding apparatus having a first weld head and a second weld head is provided. The method includes accepting a first solar receiver tube into the welding apparatus; accepting a second solar receiver tube into the welding apparatus; adjusting a welding apparatus translation stage to abut ends of the first and second solar receiver tube; orbital welding the first and second solar receiver tubes using the first weld head; accepting a third solar receiver tube into the welding apparatus; adjusting a welding apparatus translation stage to abut ends of the first and second solar receiver tube; and orbital welding the second and third solar receiver tubes using the second weld head.

These features together with the various ancillary provisions and features which will become apparent to those skilled in the art from the following detailed description, are attained by the joining apparatus and method of the present invention, preferred embodiments thereof being shown with reference to the accompanying drawings, by way of example only, wherein:

BRIEF DESCRIPTION OF THE DRAWINGS

FIG. 8 is a sectional top view of an alternative embodiment welding station;
FIG. 9 is an end view of the welding station of FIG. 8;
FIG. 10 is one embodiment of a purge trap disc assembly;

FIG. 12 illustrates two tubes welded together;

FIG. 15 is a side view of a second embodiment of double joining welding station for joining three tubes;

FIG. 16 is a top view of the welding station of FIG. 15;

FIG. 21C is a side view 21-21 of FIG. 15 illustrating the extended position of a weld head and process chamber with a sealed process chamber;

Reference symbols are used in the Figures to indicate certain components, aspects or features shown therein, with reference symbols common to more than one Figure indicating like components, aspects or features shown therein.

DETAILED DESCRIPTION OF THE INVENTION

Figure 1:
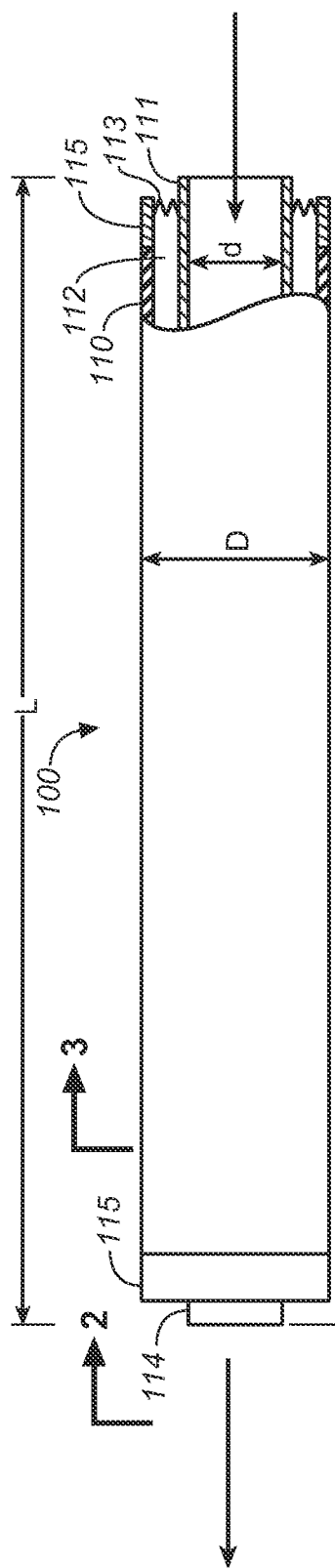
FIG. 1 is a side view of a prior art solar receiver tube.
Figure 3:
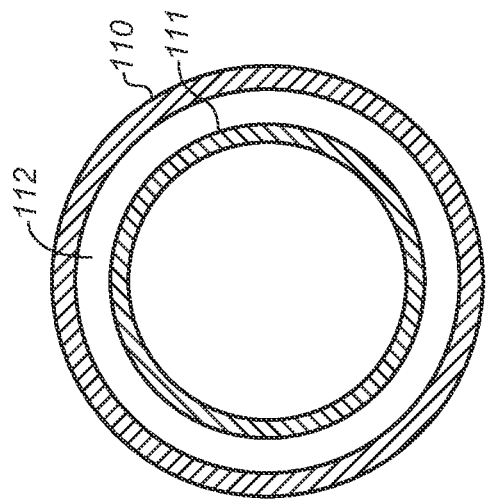
FIG. 3 is a cross-sectional view 3-3 of the tube of FIG. 1.
Figure 2:
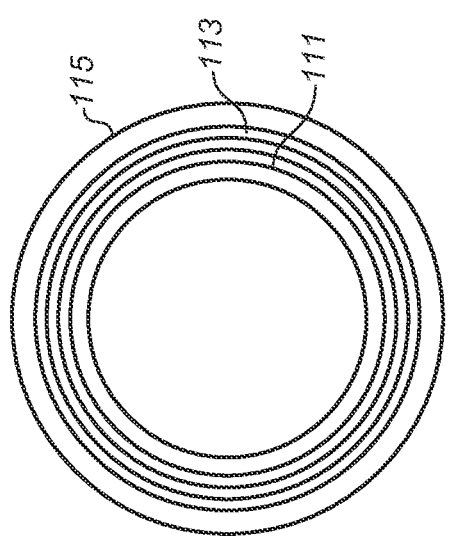
FIG. 2 is an end view 2-2 of the tube of FIG. 1.
Figure 4:
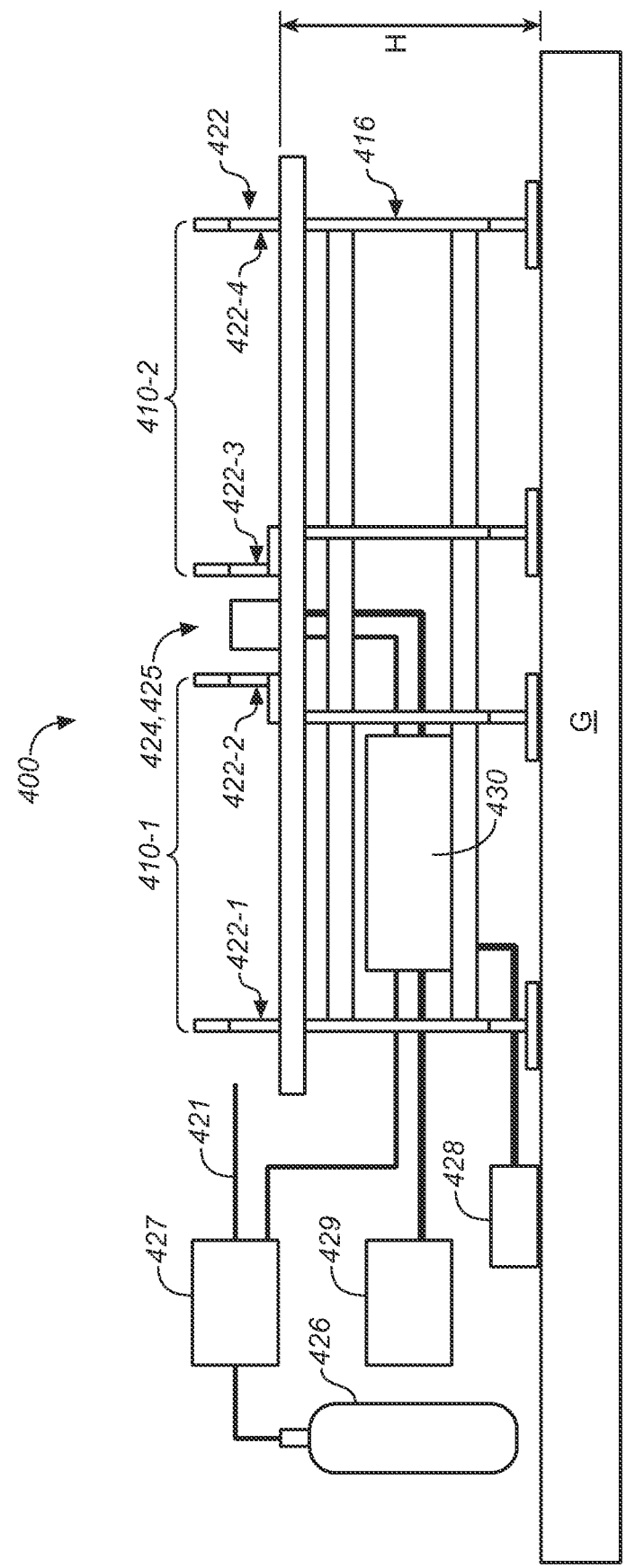
FIG. 4 is a side view of one embodiment of a welding station.
Figure 5:
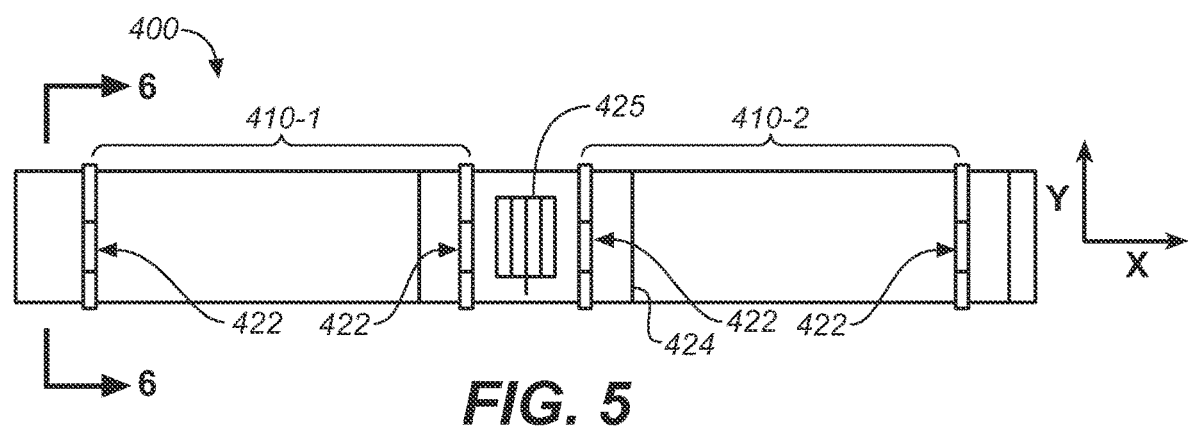
FIG. 5 is a top view of the welding station of FIG. 4.
Figure 6:
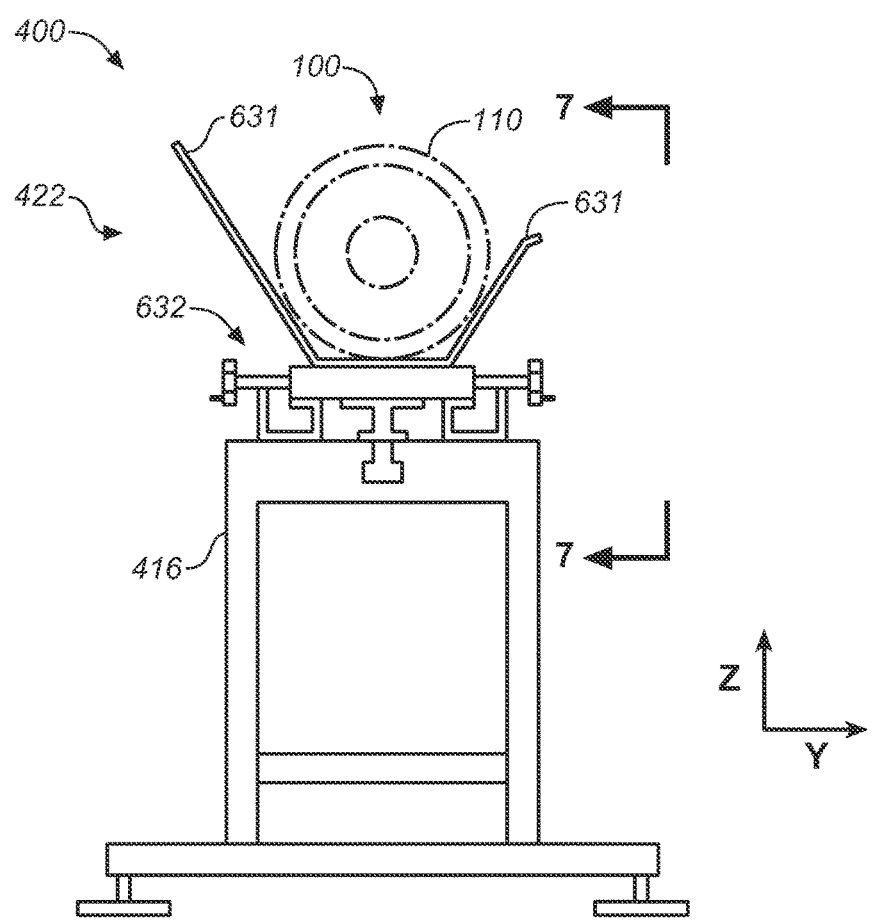
FIG. 6 is an end view of the welding station of FIG. 5.

FIGS. 4-6 are schematics of one embodiment of a welding station 400, where FIG. 4 is a side view, FIG. 5 is a top view, and FIG. 6 is an end view. Welding station 400 includes a stand 416 for positioning the welding station on the ground G and to support tube stations 410, specifically a first tube station 410-1 and a second tube station 410-2, at a height H. The height H may be, for example and without limitation, from 3 feet (0.3 m) to 5 feet (1.5 m) above the ground.

Tube stations 410-1 and 410-2 are each adapted to receive a solar receiver tube, such as two tubes 100, and both stations include two or more assemblies 422 for supporting the tube ends. Thus, for example and without limitation, four assemblies 422-1, 422-2, 422-3, and 422-4 are shown in FIG. 4, with station 410-1 associated with first assembly 422-1 and second assembly 422-2, and station 410-2 associated with third assembly 422-3, and fourth assembly 422-4. In general, assemblies 422 are positioned near the ends of tubes provided to stations 410-1 and 410-2.

Assemblies 422 may each be the same or may be different, and may include, for example and without limitation, various combinations of tube guides, supports, translation stages, and locking mechanisms to aid in the guiding, positioning and restraining of each tube within welding station 400.

Welding station 400 also includes a weld head 425 and an associated weld head process chamber 424 located between stations 410-1 and 410-2, and ancillary equipment for welding including, for example, a process gas supply 426, supply line 421 to provide gas to an accepted tube 100, a process gas controller 427, a power supply 428, a welding remote control unit 429, and a welding process controller and cooling unit 430.

Weld head 425 is adapted to fit with space 2S and a distance (D-d)/2 to weld adjacent tubes within tube stations 410-1 and 410-2. Weld head 425 may be any weld head suitable for welding the ends of pipes, and may be, for example and without limitation, a standard orbital welder or a rotational welder, with unit 430 selected as an appropriate unit. Thus, for example and without limitation, weld head 425 may be used with an Arc Machine 9-7500 welder (Arc Machines, Inc., Pacoima, Calif.) and unit 430 may include an Arc Machines model 207 power supply controller with its mating 207-CW cooling package.

Weld head process chamber 424 may include two halves, which may or may not be hinged, to permit the chamber to open and receive tubes 100, and may also include connections to receive a gas from process gas controller 427. Process gas may thus be provided to the outside of tubes 100 during welding.

In one embodiment, as illustrated in FIG. 6, assemblies 422 include lowering guides 631, also referred to as a "V supports," to guide accepted solar receiver tubes 100 (shown in phantom lines) into welding station 400. Lowering guides 631 may also include several rubber protected, radius-saddle type supports that form to the curvature and support the outer diameter of an accepted tube 100.

As further illustrated in FIG. 6, one or more components of assembly 422 may include one or more translation stages 632 to permit adjusting of an accepted solar receiver tube 100 along one or more of: the length of the tube (the "X" axis); in the plane of stand 416 and transverse to the length of an accepted tube (the "Y" axis); and in the plane of stand 416 and traverse to X and Y (the height along the "Z" axis). In addition and without limitation, weld head 425, and or lowering guides 631 may also be mounted on individual translation stages 632.

Figure 7:
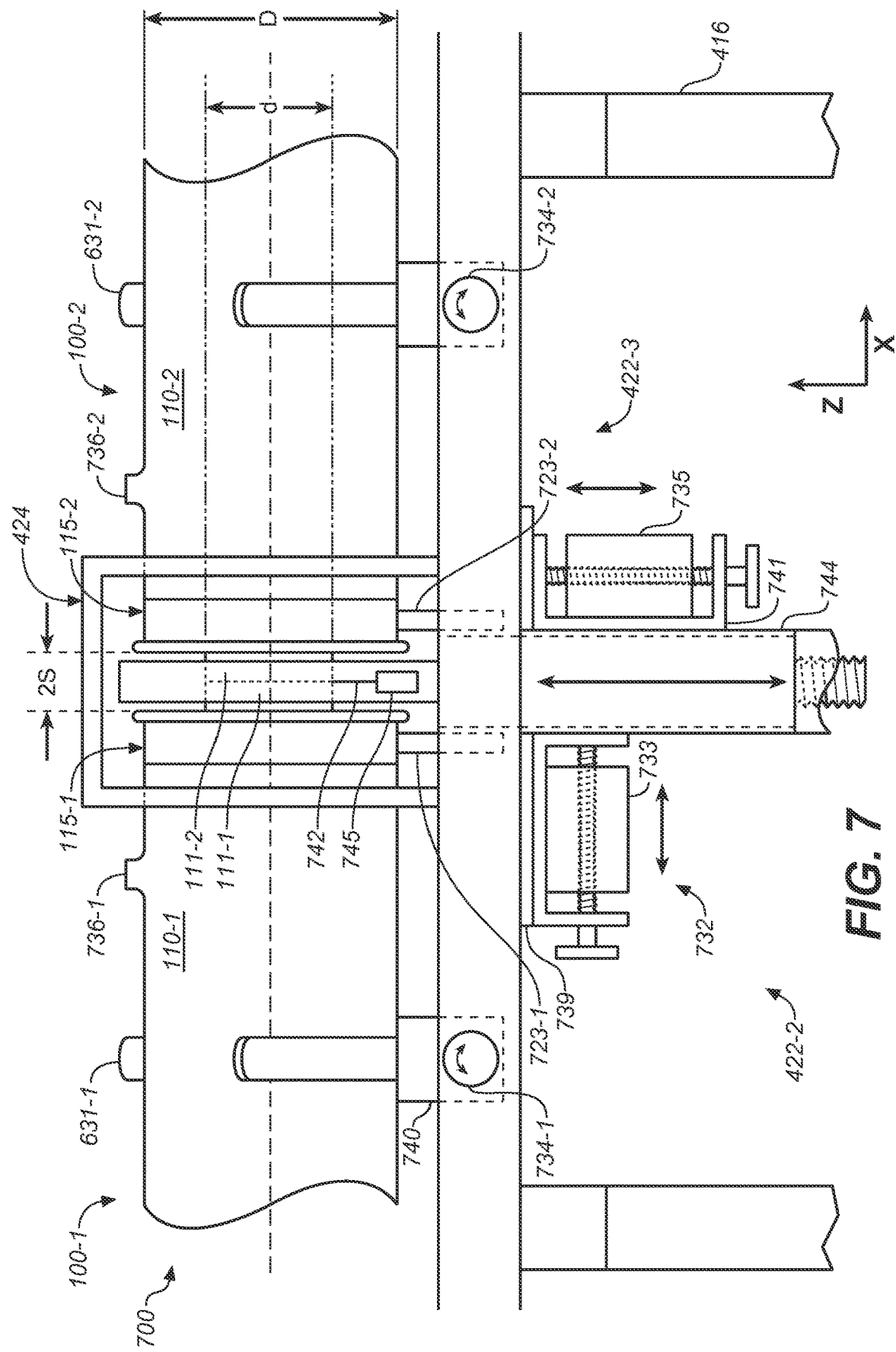
FIG. 7 is a side view of a second embodiment of a welding station.

FIG. 7 is a side view of a second embodiment of a welding station 700. Welding station 700 is generally similar to welding station 400, except were explicitly noted.

Welding station 700 includes: assembly 422-2 including perch 723-1 and a support 631-1 mounted on an X-Y translation stage 734-1 and Z-axis translation stage 740; and assembly 422-3 which includes perch 723-2 and a support 631-2 mounted on an X-Y translation stage 734-2.

For an orbital weld head 425, the weld head includes an electrode 742 and a rotor 745 that may be moved into place for welding via a retraction mechanism 744, and adjusted using fine tuning adjustments of X-Y translation stage 733, X-axis translation stage 739, Z-axis translation stage 735 and 741. Alternatively, weld head 425 may translate relative to stand 416 and not include retraction mechanism 744.

Translation stages 734-1 and 734-2, 733, 735, 739, 740, and 741 may be, for example and without limitation, screw slide mechanisms.

For illustrative purposes, welding station 700 is shown as having accepted first tube 100-1, having a glass outer tube 110-1 and a flange 115-1, and second tube 100-2, having a glass outer tube 110-2 and a flange 115-2. In addition, each glass tube 110-1 and 110-2 is shown as having a corresponding nipple 736-1 and 736-2 that remains from the tube manufacturing process. In one embodiment, nipples 736-1 and 736-2 are aligned and oriented in the same plane.

Perches 723-1, 723-2 are adapted to accept and support tubes, such as tubes 100-1 and 100-2. Thus, for example, perches 723-1, 723-2 each have a radius that is adapted to accept metal flange portion 115 and tube 110, respectively. In addition, one or more of perches 723-1, 723-2 may be grounded to form a ground for welding adjacent tubes. Thus, for example, one or more of perches may include a metal piece electrically grounded relative to said first weld head and to said second weld head, and positioned to contact at least one metal collar of the end of one of the accepted first, second, or third solar receiver tube. Other means for restraining the tube 100 for welding include, but are not limited to, clamps, saddles, perches, straps, and combinations thereof.

Process chamber 424 may be positioned to cover weld head 425 and provides a protected or sealed environment around the ends of accepted solar receiver tubes 100-1 and 100-2. In one embodiment, the interior of process chamber 424 is configured to be purged with a gas provided, for example, by process gas supply 426.

Translation stages 739, 740, 741 provide adjustments of accepted tubes 100-1 and 100-2 along the X, Y, and Z axes. Specifically, X-axis translation stage 739 permits adjustment of the electrode 742 for alignment of the weld joint with the tube ends, translation stage 740 permits adjustment of tube-to-tube alignment in the plane of the stand, and the Z axis translation stage 741 permits vertical adjustments to fine tune electrode concentricity for welding. In one embodiment, glass supports 631 are mounted to the stages 740 in the welding station stand and restrain outer glass tubes of the solar receiver tubes.

Retraction mechanism 744 allows weld head 425, including the electrode 742 and rotor 745, into position for welding. Retraction mechanism 744 may, for example and without limitation, be slide mounted and air or electrically actuated. Preferably, the weld head 425 is retractable to a position that is below the bottom edge of the received solar receiver tubes 100-1, 100-2. The retractable weld head 425 facilitates placement of the solar receiver tubes 100-1, 100-2 during loading and unloading.

In one embodiment, translation stages 733, 734-1 and 734-2 permitting fine adjustment in the X-Y plane for tube-to-tube alignment of accepted tubes 100-1 and 100-2. In an alternative embodiment, the translation stages 734-1 and 734-2 include the V-support 631, and the Y-axis adjustment may be achieved by sliding weld head 425 in a machined slot mounted to stand 416. Thus, for example, tubes are manually presented to the rotational weld fixture and indexed on receiver tube metal collar/bellows not requiring a Z-axis adjustment on receiver tube supports. Z-axis adjustment using translation stage 735 may provide for adjusting the position of electrode 742, enabling centerline seem adjustment of the electrode to the joint.

In certain embodiments, it is advantageous to provide a process gas to a joining location on the inside of accepted tubes 100, especially when the tubes are being welded. FIG. 10 shows a purge trap disc assembly 1000. Assembly 1000 is used to provide control of gases on the interior of tubes 111-1 and 111-2 near ends that are being joined. Assembly 1000 includes a first disc 1001 and a second disc 1003. Discs 1001 and 1003 have outer diameters that match the inner diameters of tubes 111, and has a pair of circular seals 1005 that seat against the metal tube 111 of each tube, isolating a region about the abutted collars such that process gas can be provided to the inside metal surface near the location at which welding will occur. Disc 1103 has a line 1104 that may be connected to supply line 421, and disc 1101 has an opening 1102. Assembly 1000 may thus receive gas from supply 427, which purges the space within tubes 111 between discs 1001 and 1003. A sparging process gas is vented through the sealed portion of tube during welding, eliminating metal oxidation on the interior of weld seam.

FIG. 8 is a sectional top view of an alternative embodiment welding station 800, and FIG. 9 is an end view of the embodiment of welding station 800. Welding station 800 is generally similar to welding stations 400 and 700, except where explicitly discussed.

Welding station 800 includes a supporting channel 846, optionally equipped with a protective cap 847, attached to the welding station stand 416, an assembly 422-1 including a saddle support 837-1; and an assembly 422-4 including a saddle support 837-2. Saddle supports 837-1, 837-2 are adapted to accept and support tubes, such as tubes 100-1 and 100-2.

In welding station 800, supporting channels 846 has a width sufficient to support the outer diameter of solar receiver tubes 100-1, 100-2 on saddles 837-1, 837-2, respectively, each of which may be coupled to a translation stage 734. One or more channels may be connected together, or be individually fixed to a welding station stand. In one embodiment, the outer glass portions 110 of the solar receiver tubes longitudinally contact cushions on the saddles 837. In this embodiment, the lowering guides 631, and stages 734 are both optional.

Figure 11A:
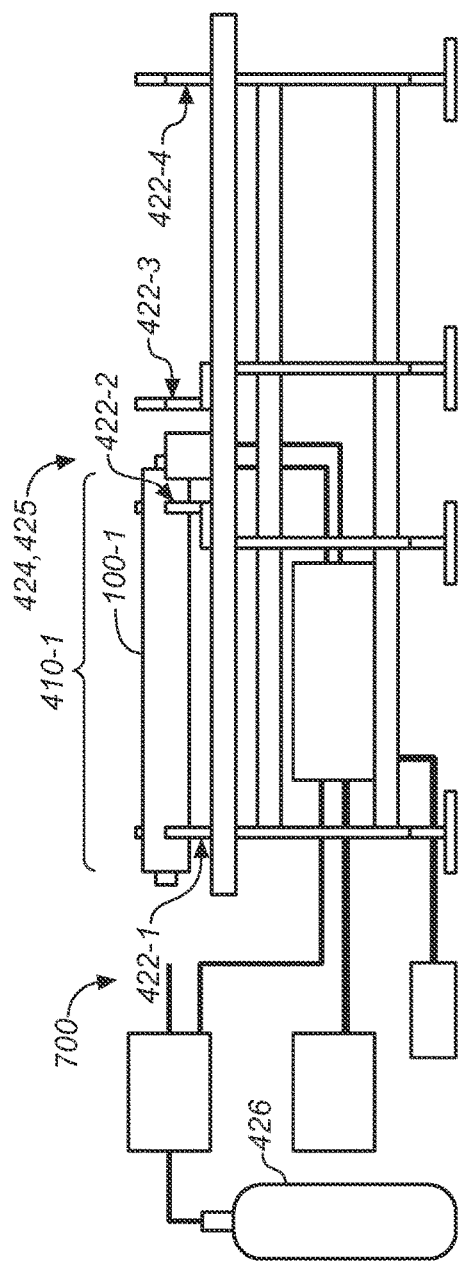
FIGS. 11A-11C illustrates a process for welding together solar receiving tubes.
Figure 11B:
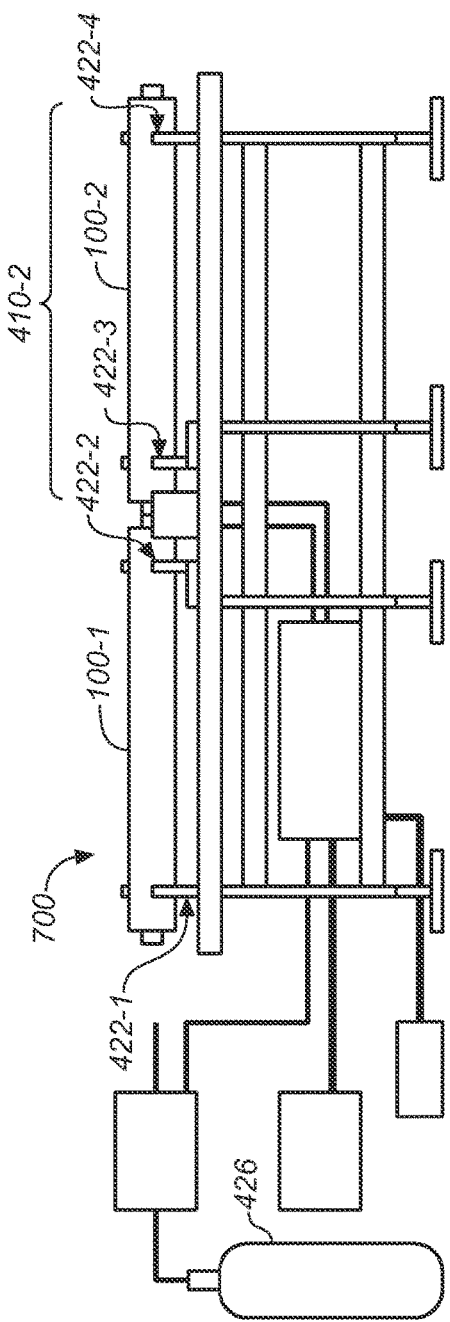
Figure 11C:
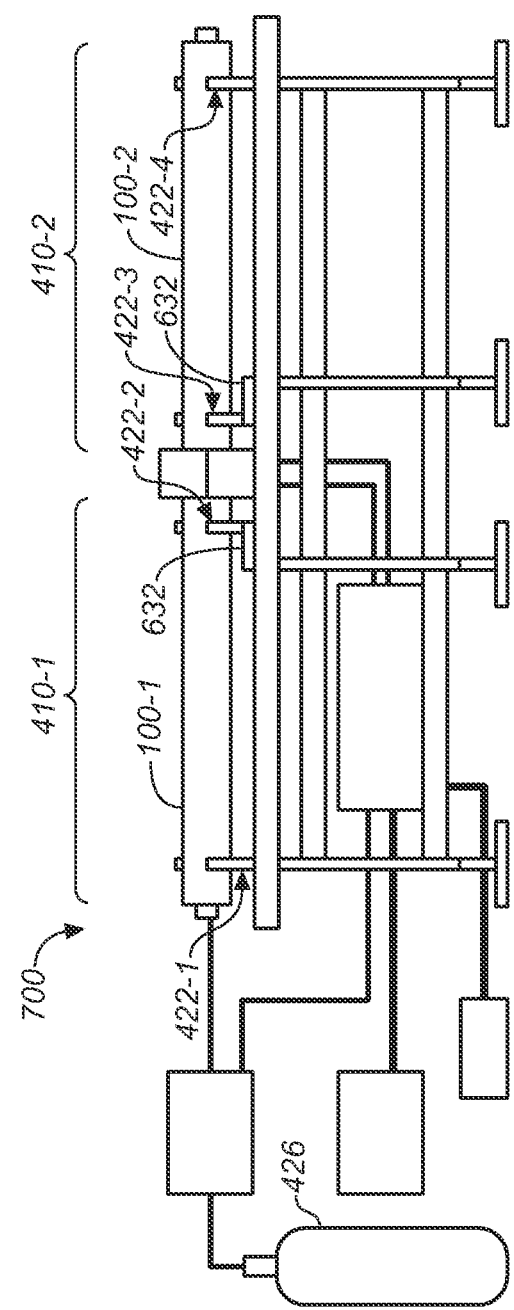

FIGS. 11A-11C are illustrative of, but not meant to limit, one method of using a welding station, such as welding station 400, 700, or 800. Initially, any clamps on assemblies 422, weld head 425, and process chamber 424 are open, permitting acceptance of solar receiver tubes 100.

For embodiments where the weld head 425 is mounted on a retraction mechanism 744, the weld head 425 is positioned below the tubes until needed for welding, at which time it is raised into welding position, and the tubes are translated relative to the electrode 742.

First, as shown in FIG. 11A, a first receiver tube 100-1 is lowered onto lowering guides 631 of assemblies 422-1 and 422-2.

One illustrative example, which is not meant to limit the scope of the present invention, is described with reference to the embodiment of FIG. 7. The lowering guides facilitate placement of the solar receiver tube on the perch 723. Thus, for example the electrode 742 is required to rotate about the adjoining solar receiver tube ends with a nearly constant arc gap. The lowering guides direct the metal-flanged ends 115 of the solar receiver tubes onto the perches 723 and coarsely index mating the tube ends end-to-end. The X axis position may then be adjusted so that the electrode 742 points to the centerline (dashed line) of the eventual weld joint.

In certain embodiments, lowering guides 631 include a portion that accepts the collar 114 index to maintain the weld stub of the tube in proper rotational relationship to a rotational weld fixture electrode of the welding station.

Next, with reference to FIG. 11B, a second tube 100-2 is lowered onto lowering guides 631 of second tube station 410-2. In one embodiment, the weight of tubes 100-1 and 100-2 is sufficient to secure the tubes for welding. In another embodiment, positive restraint mechanisms, such as clamps, are provide to restrain one or more of tubes 100-1, 100-2. X-Y translation stages 632, 733, 734-1 and 734-2 are then adjusted for tube-to-tube alignment of accepted tubes 100-1 and 100-2 such that the ends of their respective tubes 111 are in contact.

Next, with reference to FIG. 11C, purge trap disc assembly 1000 is attached to supply line 421 and is inserted into an open end of the metal tube 111 of tube 100-1, and process chamber 424 is placed about the ends of tubes 100-1 and 100-2. Process gas is then supplied to assembly 1000 and process chamber 424 to provide a controlled gas mixture for the welding of tubes 100-1, 100-2 to eliminate or reduce metal oxidation at the weld site.

At this point tubes 100-1 and 100-2 are ready for welding. An operator engages the sequence start button of the welding process controller and cooling unit 430, and a preprogrammed weld sequence fuses the ends of their respective tubes 111.

After welding, assembly 1000 is removed from the welded tubes 1200, process chamber 424 is opened, any straps or clamps are opened, and the welded tubes 1200 are removed from welding station 700. FIG. 12 shows the welded tubes 1200 as including tubes 100-1 and 100-2.

Figure 13:
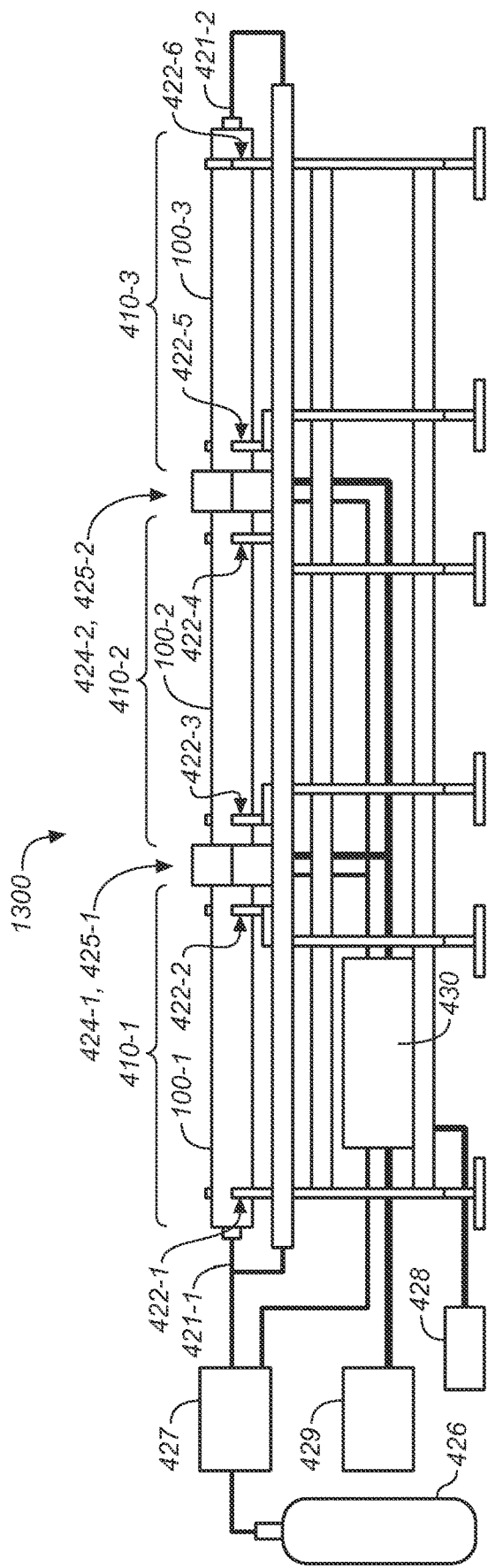
FIG. 13 an embodiment of a double joining welding station.

FIG. 13 is an embodiment of a double joining welding station 1300 for joining three tubes 100. Welding station 1300 is generally similar to welding stations 400, 700, and 800 except where explicitly discussed.

Welding station 1300 includes first tube station 410-1, second tube station 410-2, and a third tube station 410-3. Tube stations 410-1 and 410-2 are adapted to receive tubes 100-1 and 100-1, as described in other embodiments of the welding station, and tube station 410-3 includes assemblies 422-5 and 422-6 to accept a third tube 100-3. Assemblies 422-5 and 422-6 are generally similar to previously discussed assembly 422.

Welding station 1300 includes a first weld head 425-1 and a second weld head 425-2. Weld heads 425-1 and 425-2 are generally similar to weld head 425, including mounting, positioning and translation capabilities. Welding station 1300 also includes a first weld head process chamber 424-1 and a second weld head 425-2 disposed inside a second weld head process chamber 424-2. Weld heads 425-1 and 425-2 are generally similar to weld head 425, including mounting, positioning and translation capabilities, and process chambers 424-1 and 424-2 are generally similar to process chamber 424.

Welding station 1300 also includes a first supply line 421-1 and a second supply line 422-2. First supply line 421-1 provides gas to a first disc assembly 1000 that may be inserted to the junction of tubes 100-1 and 100-2. Second supply line 421-2 provides gas to a second disc assembly 1000 that may be inserted to the junction of tubes 100-2 and 100-3.

Welding station 1300 is used in a manner similar to the method illustrated in FIG. 7. A first tube 100-1 is placed in station 410-1 and a second tube 100-2 is placed in station 410-2. Tubes 100-1 and 100-2 are welded, and then a third tube 100-3 is placed in station 410-3. Third tube 100-3 is then welded to tube 100-3.

Figure 14:
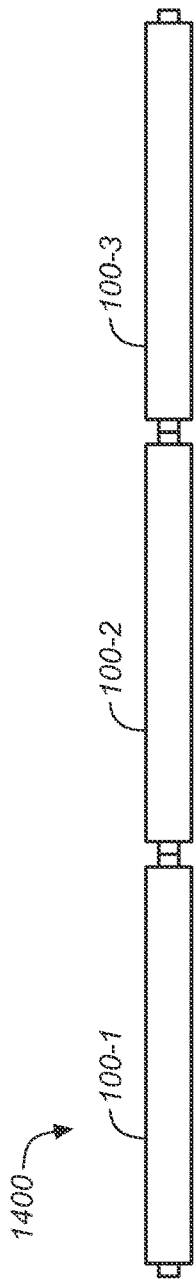
FIG. 14 illustrates three tubes welded together.

After welding, assemblies 1000 are removed from the welded tubes 1400, process chambers 424-1 and 424-2 are opened, any straps or clamps are opened, and the welded tubes 1400 are removed from welding station 1300. FIG. 14 shows the welded tubes 1400 as including tubes 100-1, 100-2, and 100-3.

FIGS. 15-22 are illustrative of a second embodiment of double joining welding station 1500 for joining three tubes 100. Welding station 1500 is generally similar to welding stations 400, 700, 800, and 1300, except where explicitly discussed.

Figure 17:
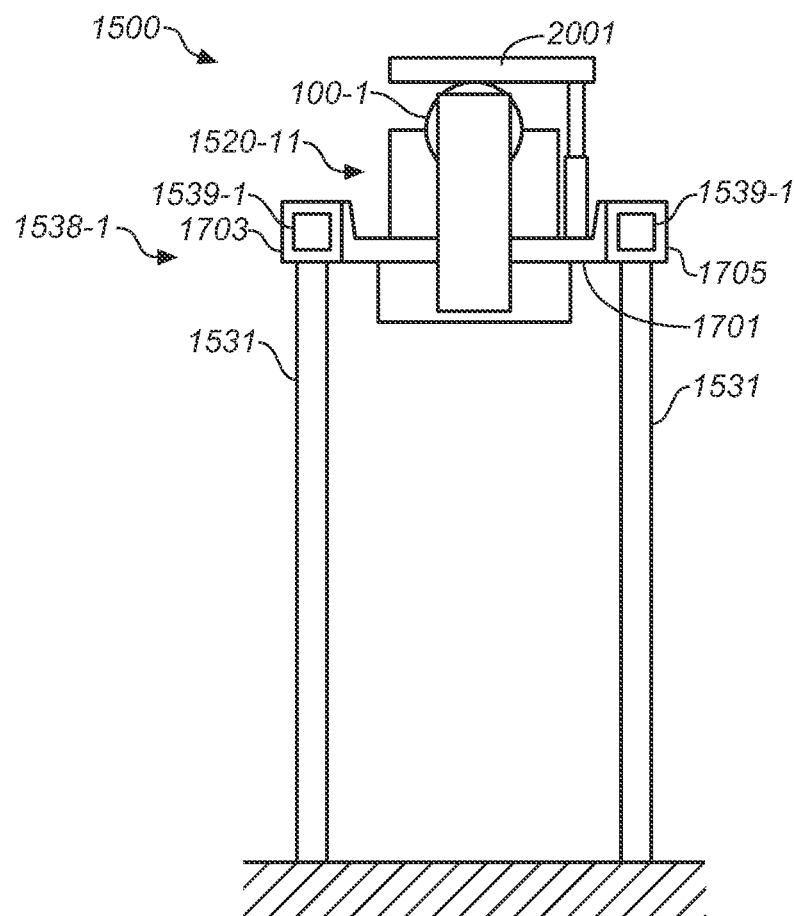
FIG. 17 is an end view of the welding station of FIG. 15.

FIG. 15 is a side view, FIG. 16 is a top view, and FIG. 17 is an end view of welding station 1500. Welding station 1500 includes two weld head and process chambers 1540: a first weld head and process chamber 1540-1 and a second weld head and process chamber 1540-2. Weld head and process chamber 1540 may be generally similar to weld head 425 and weld head process chamber 424.

When adapted to weld three tubes, welding station 1500 includes three tube stations 1510 for accepting tubes 100. Tube stations 1510 may be generally similar to tube stations 410. Tube stations 1510 include a tube station 1510-1 is adapted to accept tube 100-1, a tube station 1510-2 to accept tube 100-2, and a tube station 1510-3 to accept tube 100-3. Tube stations 1510-1 and 1510-2 may be used to position end of tubes 100-1 and 100-2 near or within weld head and process chamber 1540-1. Tube stations 1510-2 and 1510-3 may be used to position end of tube 100-2 and 100-3 is near or within weld head and process chamber 1540-2.

Tube stations 1501-1, 1501-2, and 1501-3 include assemblies 1520 for supporting tubes 100, which may be generally similar to assemblies 422. Thus, for example and without limitation, welding station 1500 includes six assemblies 1520-11, 1520-12, 1520-21, 1520-22, 1520-31, and 1520-31, with tube station 1510-1 associated with first assembly 1520-11 and second assembly 1520-12, tube station 1510-2 associated with first assembly 1520-21 and second assembly 1520-22, and tube station 1510-3 associated with first assembly 1520-31 and second assembly 1520-32. Assemblies 1520 may also include guides 631.

In one embodiment, welding station 1500 includes an adjustable stand 1530 for positioning the welding station on the ground G and to support tube stations 1510. Stand 1530, which may be generally similar to stand 416, includes legs 1531, 1533, 1535, and 1537 which support platforms 1538-1, 1538-2, 1538-3, and 1538-4. Platform 1538-1 includes assembly 1520-11, platform 1538-2 includes assemblies 1520-12 and 1520-21, platform 1538-3 includes assemblies 1520-22 and 1520-31, and platform 1538-4 includes assembly 1520-32.

Pairs of rails 1539-1, 1539-2, and 1539-3 are connected at assemblies 1520 to form a rigid stand 1530. In one embodiment, rails 1539-1, 1539-2, and 1539-3 are segments of rails spanning the length of welding station 1500, and support platforms 1538-1, 1538-2, 1538-3, and 1538-4 may be placed along the rail to adapt the length of tubes 100-1, 100-2, 100-3. In another embodiment, rails 1539-1, 1539-2, and 1539-3 are separate rails that telescope in support platforms 1538-1, 1538-2, 1538-3, and 1538-4 to adapt the length of tubes 100-1, 100-2, and 100-3.

FIG. 17 shows one embodiment of platform, such as 1538-1, as including a pair of tubular portions 1703 and 1705 which are connected to legs 1531, and spanning portion 1701. Tubular portions 1703 and 1705 are sized to accept tubular portions 1539 as an insert. Spanning portion 1701 may include components to support tubes, weld heads, and/or process chambers.

Weld head and process chamber 1540 is provided on stand 1530 to allow each weld head 425 to retract (move down) to allow tubes 100 to be placed and extended (moved up) to weld tubes. Thus, for example, weld heads 425-1, 425-2 are attached to platforms 1538-2, 1538-3 via retraction mechanisms 744-1, 744-2, and the platforms each have a hole 1601-1, 1601-2 to permit movement of weld heads 425-1, 425-2 for tube placement and welding (as in FIGS. 21A, 21B, and 21D) Weld heads and process chambers 1540 also permit outside covering of tubes 100 by process chambers 424, as described subsequently.

Figure 18A:
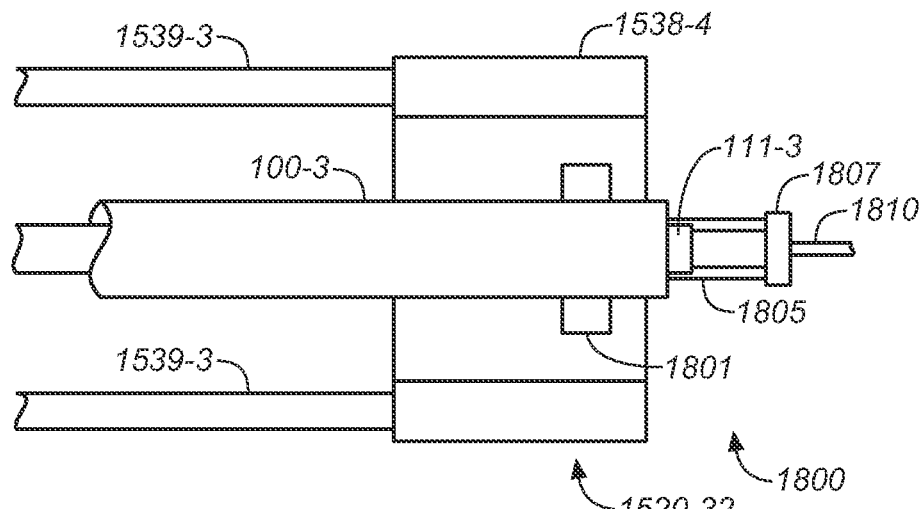
FIG. 18A is a top view 18-18 of FIG. 16 illustrating a first position of an end cap assembly.
Figure 18B:
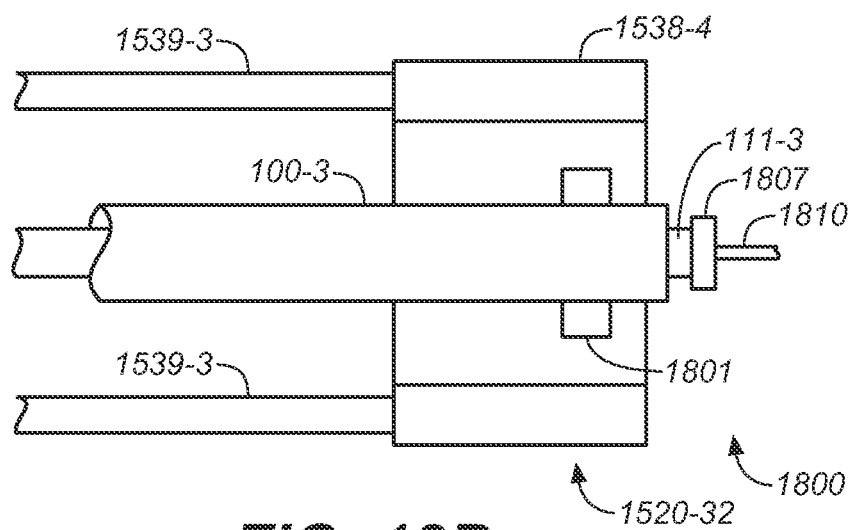
FIG. 18B is top view 18-18 of FIG. 16 illustrating a second position of an end cap assembly.
Figure 19A:
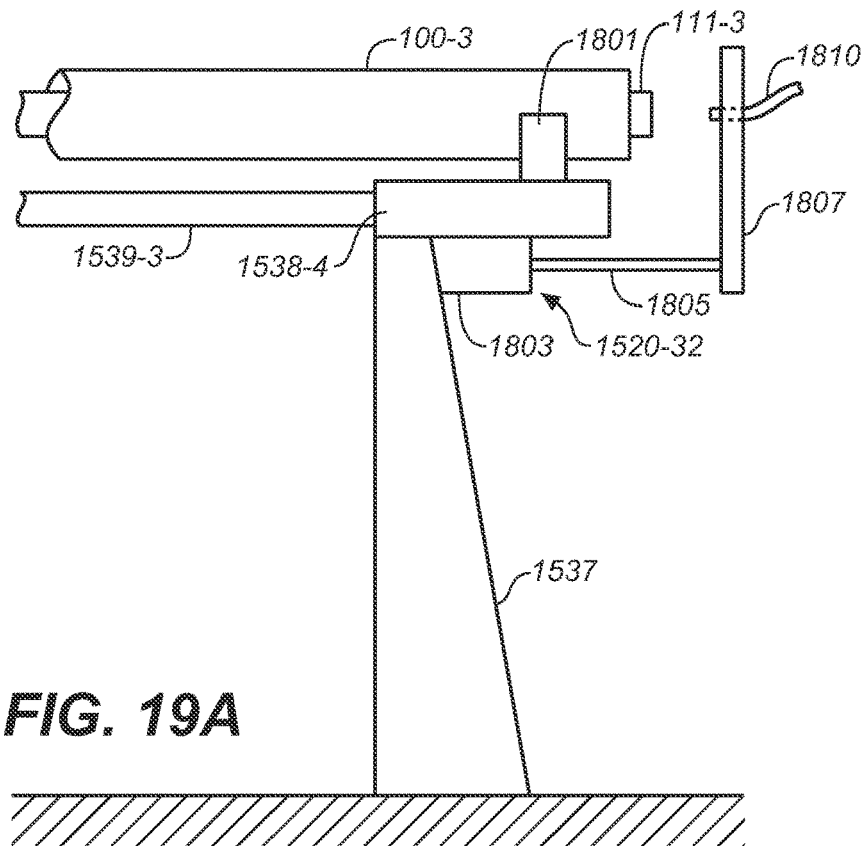
FIG. 19A is a side view 19-19 of FIG. 15 illustrating a first position of an end cap assembly.
Figure 19B:
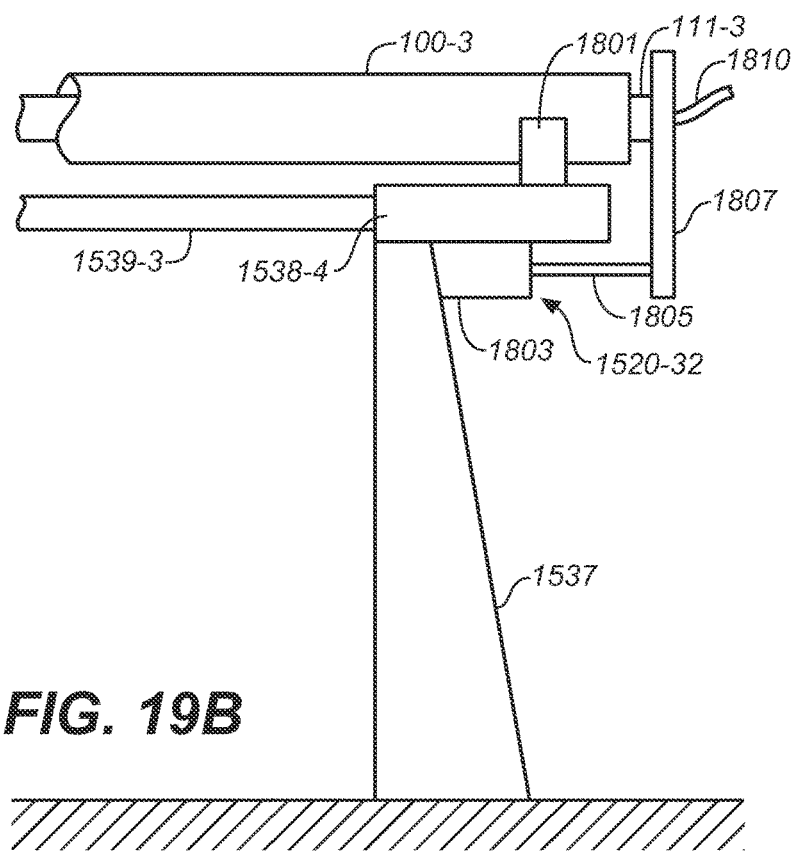
FIG. 19B is side view 19-19 of FIG. 15 illustrating a second position of an end cap assembly.

FIGS. 18A and 18B are top views 18-18 of FIG. 16 and FIGS. 19A and 19B are side views 19-19 of FIG. 15 illustrating the end cap in the first and second position, respectively.

Welding station 1500 includes a pair of end cap assemblies 1800 at the each end of the tubes which are to be welded. In the embodiment illustrated, welding station 1500 includes a pair of end cap assemblies 1800, one at an end of tube 100-1 and at one at an end of tube 100-3. End cap assemblies 1800 may be used to push the tubes 100 together for welding and/or provide access to a process gas, such the gas from process gas supply 426. End cap assembly 1800 may, for example, form part of an end assembly 1520-11 and 1520-32.

End cap assembly 1800 includes a perch 1801 having a curved surface to accept a tube 100, a motor 1803 which is attached to platform 1538, a rod 1805, and an end cap 1807 having a line 1810 that passes through the end cap within the location of an accepted tube 111. One or more of end cap assembly 1800 may also provide an electrical connection to an accepted tube 111 for grounding the tube.

Motor 1803 pushes or pulls on rod 1805, moving end cap 1807 in a longitudinal direction of accepted tube 100. In the first position of FIGS. 18A, 19A, motor 1803 pushes end cap 1807 to an extreme position, permitting the easy acceptance and placement of tube 100. In the second position of FIGS. 18B, 20B, motor 1803 pulls end cap 1807 onto the end of tube 111. Motor 1803 may provide sufficient force to move tubes 100 together. Motor 1803 may also provide sufficient force to provide a seal of end cap 1807 on tube 111. Line 1801, which passes through end cap 1807, may then be used to provide and/or remove purge cases from tubes 111-1, 111-2, and 111-3.

Motor 1803 may be, for example and without limitation, a pneumatic device such as a model CDY2S25H-100 pneumatic air linear table slide (SMC Corporation of America, Noblesville, Ind.).

Figure 20A:
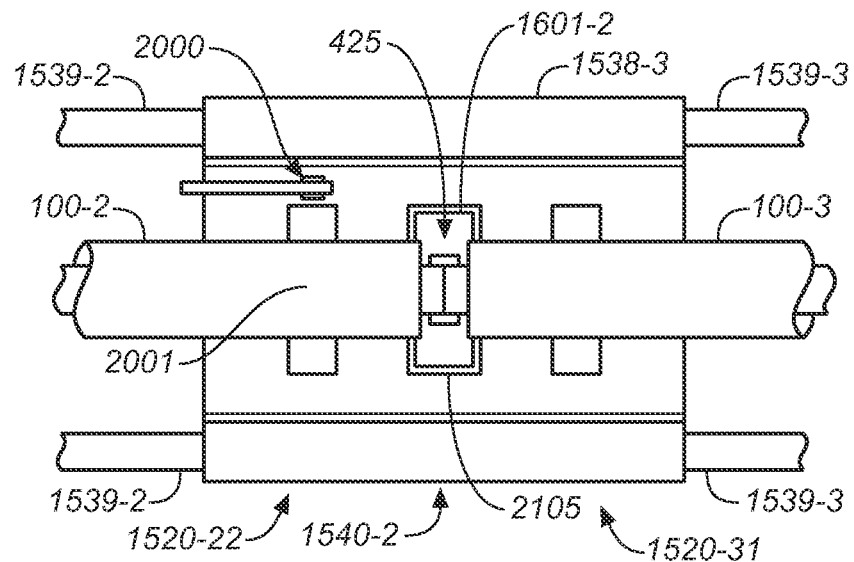
FIG. 20A is a top view 20-20 of FIG. 16 illustrating a retracted position of a weld head and process chamber.
Figure 20B:
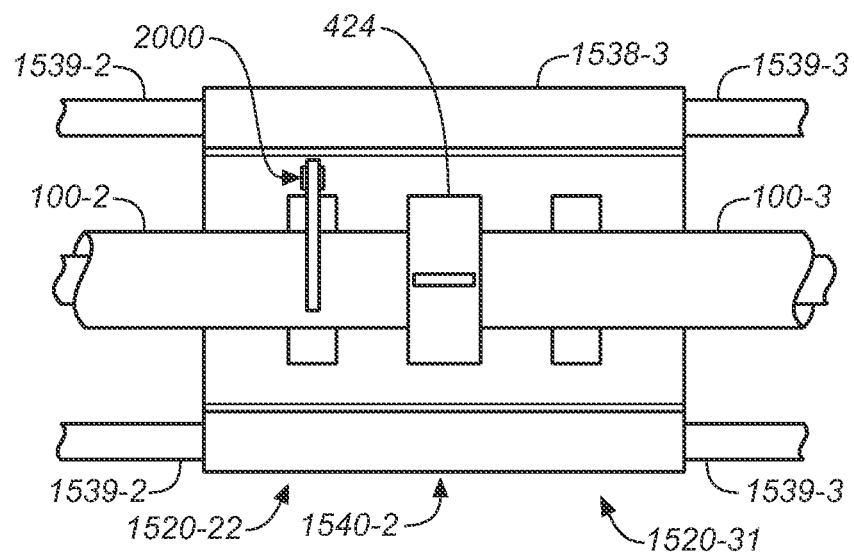
FIG. 20B is a top view 20-20 of FIG. 16 illustrating an extended position of the weld head and process chamber with a sealed process chamber.
Figure 21A:
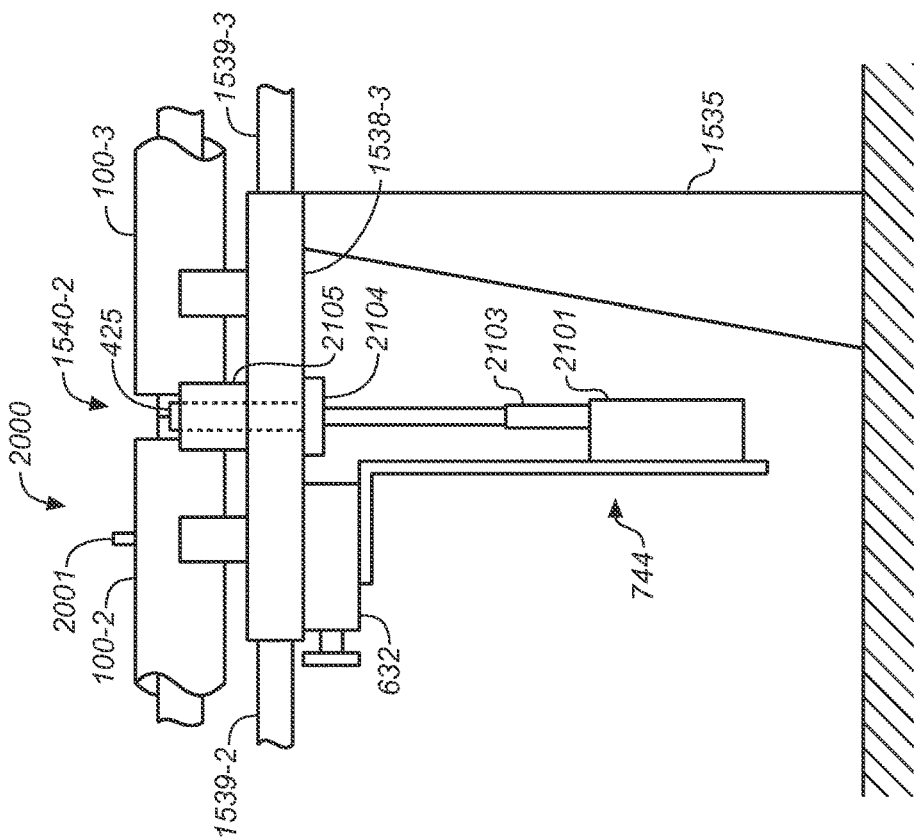
FIG. 21A is a side view 21-21 of FIG. 15 illustrating a retracted position of the weld head and process chamber.
Figure 21B:
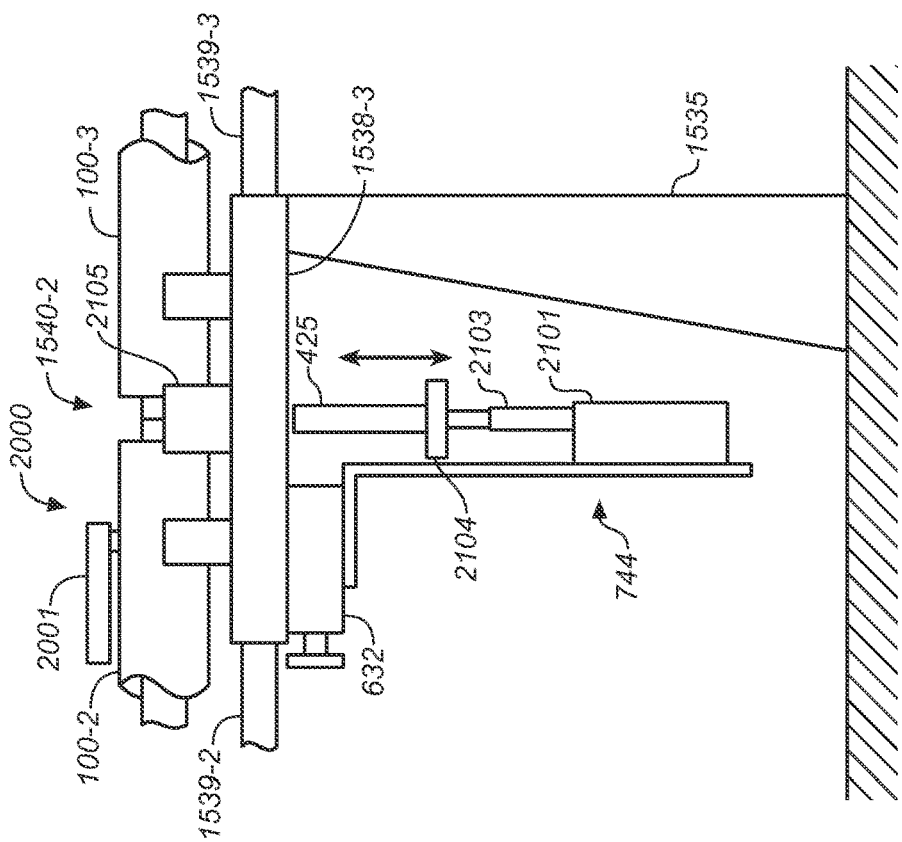
FIG. 21B is a side view 21-21 of FIG. 15 illustrating an extended position of a weld head and process chamber.
Figure 21D:
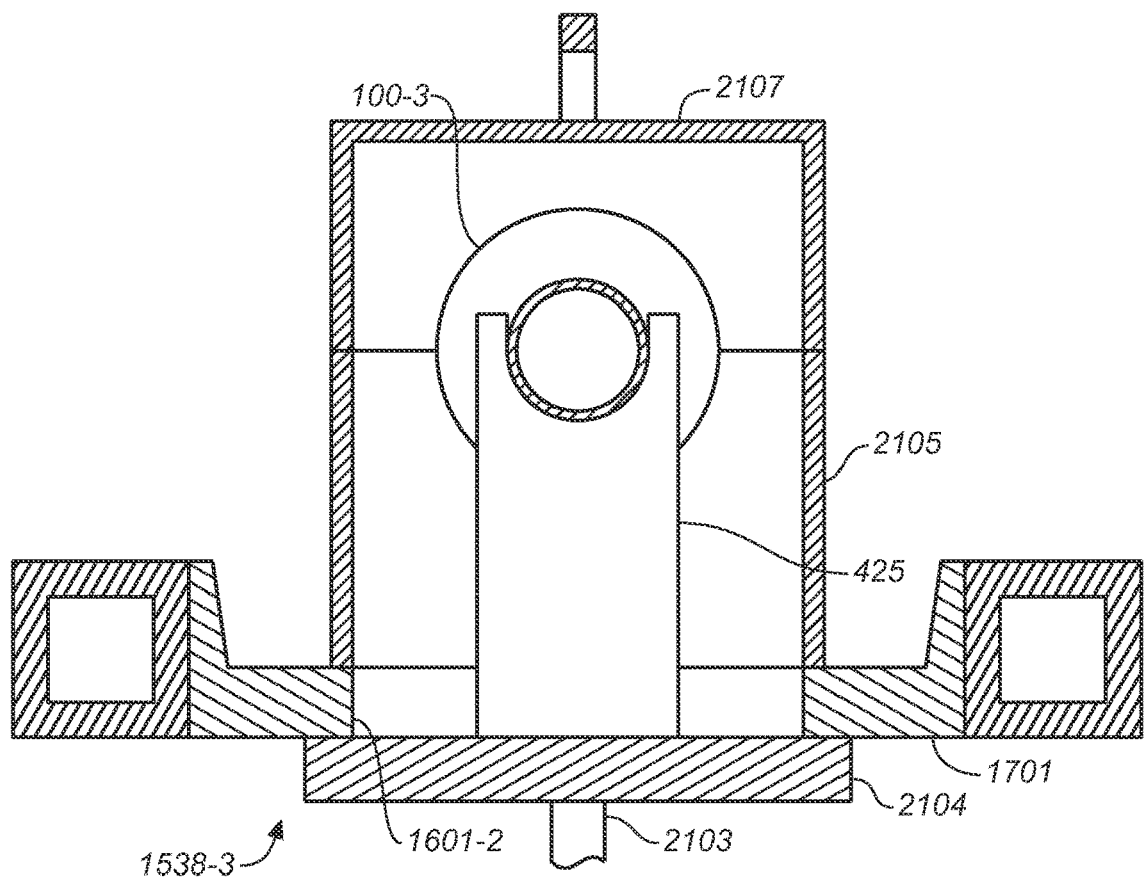
FIG. 21D is a side view 21D-21D of FIG. 21C.
Figure 21E:
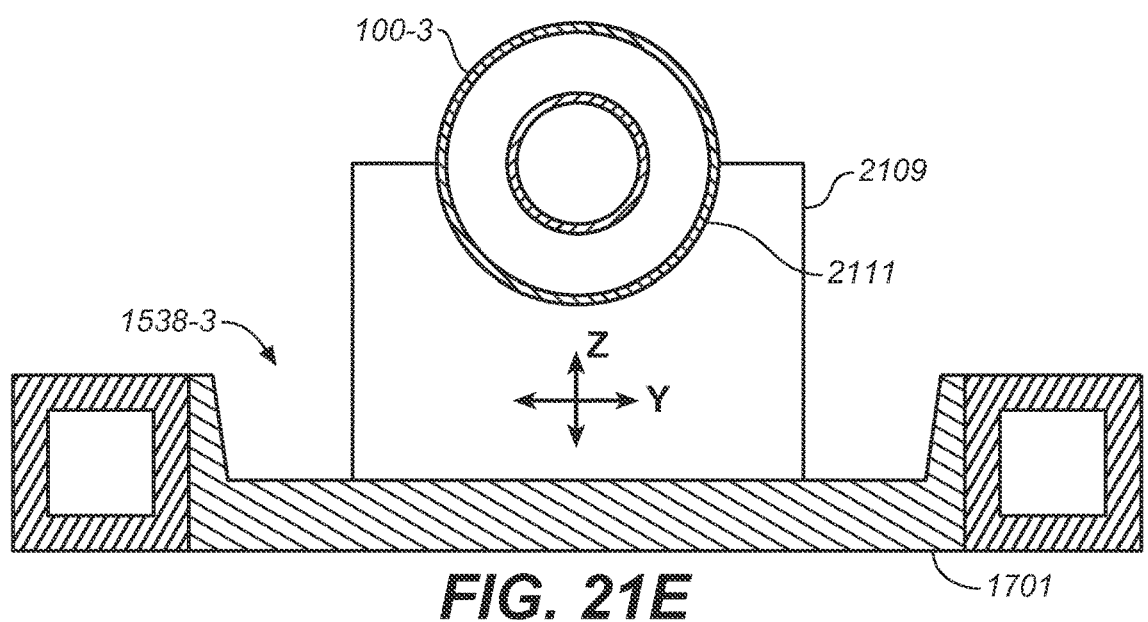
FIG. 21E is a side view 21E-21E of FIG. 21C.

FIGS. 20 and 21 illustrate various configurations of the weld head and process chamber, where FIG. 20A is a top view 20-20 of FIG. 16 illustrating a retracted position, FIG. 20B is a top view 20-20 of FIG. 16 illustrating an extended position with a sealed process chamber, FIG. 21A is a side view 21-21 of FIG. 15 illustrating a retracted position, FIG. 21B is a side view 21-21 of FIG. 15 illustrating an extended position, FIG. 21C is a side view 21-21 of FIG. 15 illustrating the extended position with a sealed process chamber, FIG. 21D is sectional view 21D-21D of FIG. 21C, and FIG. 21E is a sectional view 21E-21E of FIG. 21C.

Weld head and process chambers 1540-1, 1540-2 each includes a weld head retraction mechanism 744 which includes a motor 2101 attached to a platform, such as platform 1538-3, through translation stage 632. Retraction mechanism 744 further includes a rod 2103 that extends from motor 2101 to platform 2104, on which weld head 425 is mounted. As shown in FIGS. 20A and 21A, a process chamber bottom portion 2105 is attached to platform 1538-3 surrounding hole 1601-2, permitting welding head 425 to move to tubes 100, as shown, for example, in FIGS. 21A and 21B.

In one embodiment, platform 2104 seats against portion 1701, and a removable lid 2007 may be placed on bottom portion 2105 after tubes for welding have been received to form process chamber 424, as shown, for example in FIGS. 21D and 21D.

Welding station 1500 may alternatively include clamps to restrain on or more tubes 100. As an example, which is not meant to limit the scope of the present invention, center tube 100-2 is held in place at each end with clamp 2000-1, 2000-2 (or, in general, clamp 2000), as shown in FIGS. 15, 16, 17, 20A, 20B, 21A, 21B, and 21C. Clamp 2000 may, for example and without limitation be a swivel clamp (manufactured, for example, by DE-STA-CO Industries, Auburn Hills, Mich.) having a motor that rotates an arm 2101 to accept a tube (as in FIG. 20A) or over an accepted tube, and then pulls the tube onto the stand 1530.

Thus, for example, with tubes 100 placed in tube stations 1501-1, 1501-2, and 1501-3, the center tube is clamped by clamps 2000 (FIGS. 20A and 21A). Tubes 100 are aligned using the various translation stages. In one embodiment, tubes 100 are aligned in the y-z plane. Thus, for example, FIG. 21E illustrates a saddle 2109, which may be part of assembly 422, which includes a curved portion 2111, and is attached to translation stages to affect y and z axis adjustments. In another embodiment, a laser alignment system is used to illuminate the tube ends to facilitate alignment. End cap assemblies 1800 are then moved to force end caps 1807 onto the tube ends. Lines 1801 may then be attached to lines 421. Retraction mechanism 744 raises weld head 415 to a pair of adjacent tubes 100 (FIGS. 20B and 21B). Lid 2107 is then be placed on bottom portion 2105 to form process chambers 724, as is shown, for example, in FIG. 21D. Process gas is then provided to process chambers 724 and the interior of tubes 111, and the tubes are welded.

Figure 22:
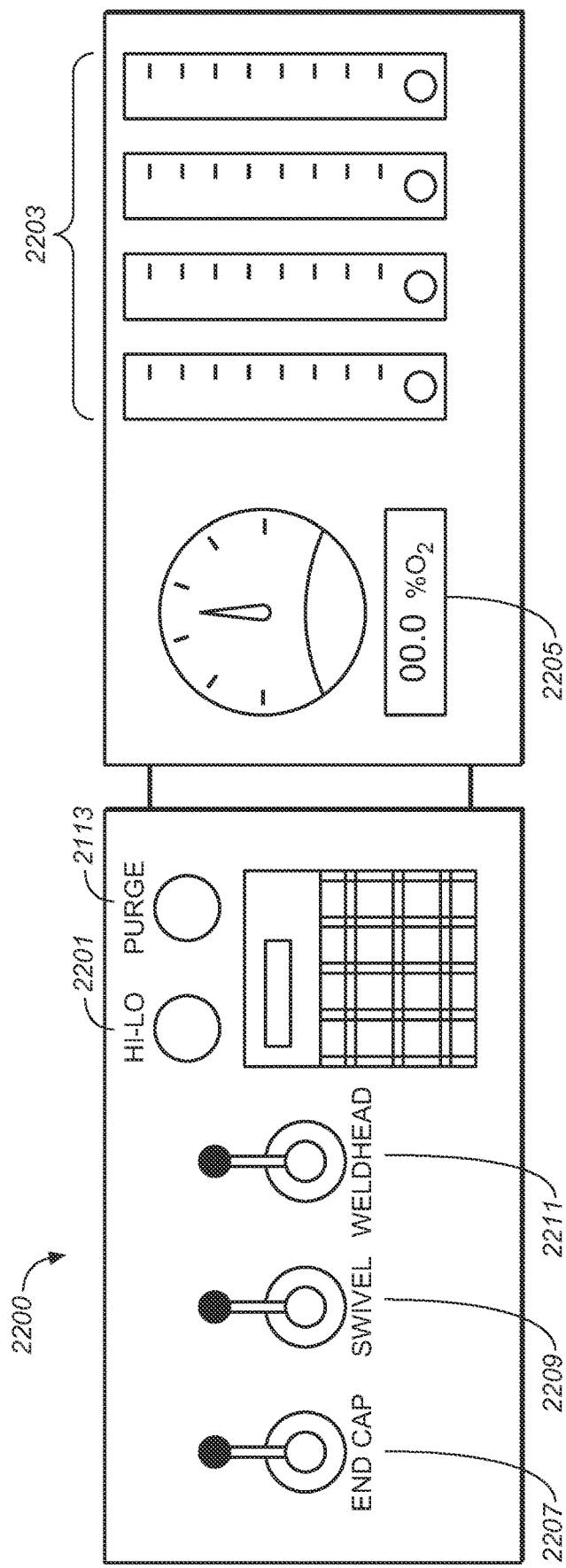
FIG. 22 is a view of one embodiment of a welding station control panel.

As shown in FIG. 22, which is one of a pair of control panel 2200 for each weld head of welding station 1400 which may include, but is not limited to: providing high and low flow rates to tubes 111 for purging and exhaust 2201, process gas flow rate and pressure sensors and meters 2203, an oxygen analyzer 2205 to measure and monitor the quality of the purge gases; switch 2207 to control end cap assemblies 1800; switch 2209 to control clamp 2000; switch 2211 to control retraction mechanism 744; and safety interlocks 2113 for purge, pneumatics, welding.

Reference throughout this specification to "one embodiment," "an embodiment," or "certain embodiments" means that a particular feature, structure or characteristic described in connection with the embodiment is included in at least one embodiment of the present invention. Thus, appearances of the phrases "in one embodiment," "in an embodiment" or "in certain embodiments" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

I claim:

1. An apparatus for joining solar receiver tubes, where said solar receiver tubes includes a first solar receiver tube, a second solar receiver tube, and a third solar receiver tube, where each of the solar received tubes includes an inner tube and an outer tube each having the same longitudinal axis, where the inner tube has an inner tube length between a first inner tube end and a second inner tube end, where the outer tube has an outer tube length between a first outer tube end and a second outer tube end, where the inner tube is coaxial with and inside of the outer tube and where the outer tube has a length that is less than a length of the inner tube, and where each of the solar receiver tubes further includes a first metal collar extending radially inwards from the first outer tube end to a location on the inner tube, where the location is a longitudinal distance from the first inner tube end and a second metal collar extending radially inwards from the second outer tube end to the location on the inner tube, where the location on the inner tube is the longitudinal distance, such that each end of each solar receiver tube includes an exposed length of the inner tube that extends beyond a corresponding metal collar by a longitudinal spacing, said apparatus comprising:

- a first weld head having a first electrode;
- a second weld head having a second electrode;
- a first perch sized to accept the outer tube of the First solar receiver tube with the first inner tube end of the first solar receiver tube near said first weld head;
- a second perch sized to accept the outer tube of the second solar receiver tube with the first end of inner tube of the second solar receiver tube near the first weld head and with the second inner tube end of the second solar receiver tube near said second weld head;
- a third perch sized to accept the outer tube of the third solar receiver tube with the first end of the outer tube of the third solar receiver tube near the second weld head;
- one or more translation stages configured to position the inner tubes of the accepted first, second, and third solar receiver tubes in said first weld head and said second weld head, and configured to move the first ends of the inner tubes of each solar receiver tube in a direction transverse to the longitudinal axis of the solar receiver tube in said first weld head and said second weld head;
- a metal piece electrically grounded relative to said first weld head and to said second weld head, and positioned to contact at least one metal collar of the end of one of the accepted first, second, or third solar receiver tube; and
- a purge as delivery system to provide purge gases during the operation of the first weld head and the second weld head, where the purge gases are provided to: 1) the interior of the first inner tube end of an accepted first solar receiver tube, 2) the interior of the first inner tube end of an accepted second solar receiver tube, 3) the interior of the second inner tube end of an accepted second solar receiver tube, and 4) the interior of the first inner tube end of an accepted third solar receiver tube, such that the first inner tube end of the first accented solar receiver tube and the first inner tube end of the second accepted solar receiver tube are adjacent to said first weld head, and
such that the second inner tube end of the second accepted solar receiver tube and the first inner tube end of the third accepted solar receiver tube are adjacent to said second weld head.

2. The apparatus of claim 1, where said first weld head is an orbital weld head.

3. The apparatus of claim 1, where said second weld head is an orbital weld head.

4. The apparatus of claim 1, where at least one of said first perch, said second perch, or said third perch includes a clamp to restrain the outer tube of one of the accepted first, second, and third solar receiver tubes.

5. The apparatus of claim 1, where at least one of said first perch, said second perch, or said third perch includes a guide for accepting one of the accepted first, second, and third solar receiver tubes.

6. The apparatus of claim 1, further including a translation stage to move said first weld head in a direction perpendicular to the axis of the accepted first, second, and third solar receiver tubes.

7. The apparatus of claim 1, further including a translation stage to move said second weld head in a direction perpendicular to the axis of the accepted first, second, and third solar receiver tubes.

8. The apparatus of claim 1, where said a first weld head has a portion with a width less than twice the longitudinal spacing and a length at least equal to a radial distance between the outer tube and the inner tube, and where said second weld head has a portion with a width less than twice the longitudinal spacing and a length at least equal to a radial distance between the outer tube and the inner tube.

9. The apparatus of claim 1, including a motor to force said first accepted solar receiver tube towards said third accepted solar receiver tube.

10. The apparatus of claim 1, where said purge gas delivery system includes
- a first end cap having a sealing surface and a first gas line, where said sealing surface is adapted to form a gas seal with the inner surface of the second inner tube end of the first solar receiver tube and where said first gas line is adapted to provide purge gas through said first end cap and into the inner tube of the accepted first solar receiver tube, and
- a second end cap having a sealing surface and a second gas line, where said sealing surface is adapted to form a gas seal with the inner surface of the second inner tube end of the third solar receiver tube and where said second gas line is adapted to provide purge gas through said second end cap and into the inner tube of the accepted third solar receiver tube.

11. The apparatus of claim 10, where said purge gas delivery system includes a motor to force said first end cap towards said second end cap.

12. The apparatus of claim 1, where said purge gas delivery system includes a purge disc trap assembly including
- a first disc having a sealing surface in contact with the inner surface of the first inner tube end of the first accepted solar receiver tube and an aperture through said disc in communication with purge gases, and
- a second disc having a sealing surface in contact with the inner surface of the first inner tube end of the second accepted solar receiver tube,
such that the inner surface of the first inner tube end of the first accepted solar receiver tube and the inner surface of the first inner tube end of the second accepted solar receiver tube are in contact with purge vases.

13. The apparatus of claim 12, where said purge disc trap assembly includes:
- a third disc having a sealing surface in contact with the inner surface of the first inner tube end of the third accepted solar receiver tube and an aperture through said disc in communication with purge gases, and a fourth disc having a sealing surface in contact with the inner surface of the second inner tube end of the second accepted solar receiver tube, such that the inner surface of the second inner tube end of the second accepted solar receiver tube and the inner surface of the first inner tube end of the third accepted solar receiver tube are in contact with purge gases.

* * * * *